United States Patent [19]
Bangs

[11] 3,919,515
[45] Nov. 11, 1975

[54] ELECTRODE HOLDER FOR EDM

[76] Inventor: Joseph F. Bangs, 1601 West Burbank Blvd., Burbank, Calif. 91505

[22] Filed: May 29, 1973

[21] Appl. No.: 364,602

[52] U.S. Cl. .................. 219/69 E; 279/20; 279/52; 408/59
[51] Int. Cl.² ..................... B23B 31/20; B23P 1/08
[58] Field of Search .................. 279/41, 46, 52, 20; 204/297 R; 219/69 E, 69 V; 408/59

[56] References Cited
UNITED STATES PATENTS

| | | | |
|---|---|---|---|
| 2,429,617 | 10/1947 | Gustafson | 279/52 |
| 2,430,260 | 11/1947 | Trott | 279/43 |
| 3,264,906 | 8/1966 | Swords | 408/59 X |
| 3,664,216 | 5/1972 | Kladich | 279/52 |
| 3,775,580 | 11/1973 | Scherbaum | 219/69 E |

*Primary Examiner*—J. M. Meister
*Assistant Examiner*—Z. R. Bilinsky
*Attorney, Agent, or Firm*—John E. Wagner

[57] ABSTRACT

Disclosed is an electrode holder for electric discharge machining systems employing a body member, a collet and a chuck designed to hold hollow electrode in rigid concentric position for ease of manual electrode advance for liquid tight positioning. The collet constituting the heart of the electrode holder includes an elongated central bore having a predetermined tolerance relationship with the electrode exterior outside diameter. The collet includes elongated fine slit for applying uniform pressure to the side of the electrode and to provide a fluid tight seal therebetween. The collet employs surfaces engaging the chuck to assert uniform pressure and maintain the collet concentric in the body.

4 Claims, 4 Drawing Figures

ELECTRODE HOLDER FOR EDM

BACKGROUND OF THE INVENTION

With the advent of electric discharge machining, precise removal of metal can be accomplished in situations where conventional rotating and oscillating cutters or drills have been incapable of meeting requirements. Electric discharge machining, its principles and practice are best described in Baumeister and Marks, Standard Handbook for Mechanical Engineers, 7th Edition, Copyright 1967 McGraw-Hill Book Co. of N.Y., N.Y., Section 13–103.

Suffice it to say that metal is removed from a work piece by the application of a train of pulses of electrical current between an electrode and the work piece constituting the second electrode. The discharge area is flooded with a dielectric fluid such as oil which carries away the eroded material. Precise control and removal of material is possible at rates of 0.05 to 0.2 in.[3] per minute with surface smoothness in the order of 25 microinches. The process is particularly useful for producing small diameter, e.g. 0.012 to 0.125 in. holes in solid metal. Such holes have heretofore been extremely difficult to drill accurately because of the tendency of small diameter twist drills to wander.

Characteristic of one form of this process referred to EDM, a consumable electrode in the form of a tube is used. The consumable electrode held similar to a drill bit in a chuck requires frequent release, advance and regripping. Since the electrode is designed particularly for use in precise machining operations, the exact positioning of the electrode in the chuck is a necessity. Frequent opening and closing of the chuck employing conventional collets or holders presents problems of wear and eccentric loading of the electrode and non concentric placement. Even more difficult situations is that the electrodes are hollow and a flushing fluid introduced into the work area through the center of the electrode. This fluid which is fed under pressure necessitates a fluid seal within the electrode holder which acts to prevent leakage of the fluid around the electrode and interfers with operation. Of great significance is the fact that to change or extend an electrode, the electrode must be released from the first chuck positioning it and also from its surrounding fluid seal plus resealing. The net result is that the frequent stop of advancing the electrode is far more time consuming for the operator than should be required.

BRIEF STATEMENT OF THE INVENTION

I have been faced with the problems discussed above and as a result have invented a new electrode holder which is superior in maintaining the concentricity of the electrode in the holder and at the same time provides a superior flushing fluid seal of entirely metal parts. Further, in accordance with my design, the collet and seal are integral and release of the collet for advance of the electrode automatically releases the fluid seal temporarily.

BRIEF DESCRIPTION OF THE DRAWINGS

This invention may be more clearly understood from the following detailed description and by reference to the drawings in which.

DETAILED DESCRIPTION OF THE INVENTION

The application of the electrode assembly of this invention is best illustrated first by means of a diagram of a particular EDM apparatus for drilling minute holes.

Figure 1:
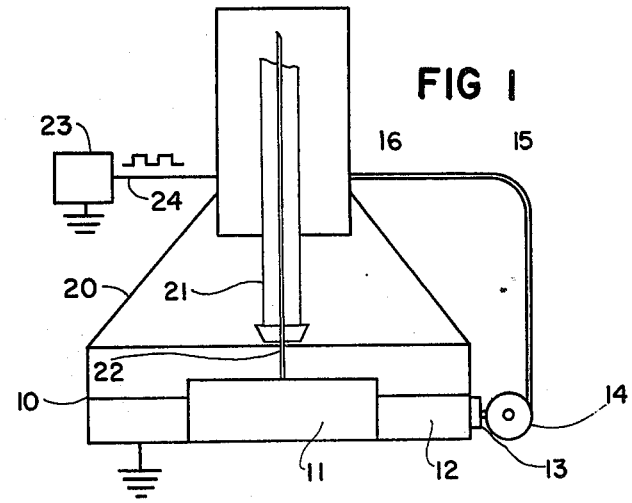
FIG. 1 is a simplified schematic diagram of an electric discharge machining apparatus.

Now referring to FIG. 1 showing the apparatus, the basic equipment includes a base 10 represented schematically as a pan which is electrically connected to ground and holds the work piece 11. The pan 10 constitutes a reservoir for dielectric flushing fluid 12 which is passed through a filter 13 and raised by a pump 14 via conduit 15 to the housing 16. This housing is supported by upstanding brace 20 and supports an electrode holder 21 in position over the work piece 11. Extending out of the bottom of the electrode holder 21 is a tube electrode 22. The electrode 22 also appears extending upward within the housing member 16.

A power source represented simply as a source of pulses 23 is electrically connected via lead 24 to the housing 16 and via the electrode holder 21 applies pulses illustrated for simplicity as square pulses to the electrode 22.

With the electrode 22 in close proximity to the work piece 11 and with dielectric fluid 12 issuing from the central orifice of the electrode 22, a series of electric discharges occurs between the electrode 22 and work piece 11 causing erosion of the work piece which consumes the electrode 22 as well. The dielectric fluid 12 carries away the eroded material into the pan 10 where it is removed by filter 12 and then the fluid is returned by pump 14.

It should be noted in FIG. 1 that the assembly 16 must perform three functions:

1. It must mechanically support the electrode holder 21, which in turn supports electrode 22;

2. It must provide an electrical connection of pulses arriving over lead 24;

3. It must provide a liquid conduit and necessary seals to apply to the interior of the tube electrode 22 and the electrode holder 21 must in turn perform the same functions with respect to the electrode 22.

Since the electrode 22 is rapidly consumed in the process of electric discharge machining, it is necessary that the electrode 22 be released and advanced while maintaining the mechanical position, fluid tight connection, and electrical contact with the electrode.

Figure 2:
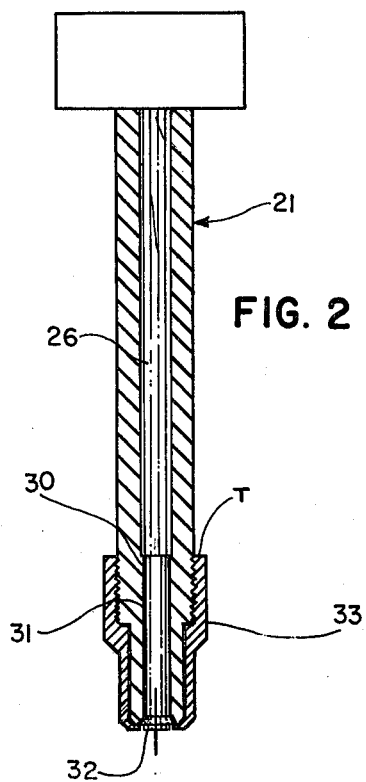
FIG. 2 is a vertical sectional view of an improved electrode holder of this invention.

How these three functions may be carried out is illustrated in FIG. 2. The electrode holder 21 is shown in section and clearly appears as a metal tube secured and sealed to assembly 16 by means unshown in the drawing. A conventional set screw may be used as securing means and an O ring seal will provide suitable sealing means since the holder 21 normally remains fixed within the assembly 16 with less frequent adjustment than the electrode 22 within the holder 21.

At the lower end of holder 21, the tubular opening 26 includes a reduced diameter throat section 30 dimensioned to receive a collet 31 having a flared end section generally designated 32. The lower end of the exterior of holder 21 is also reduced in diameter while the body portion is threaded at T. These threads engage similar threads on a chuck 33 which holds the collet 31 in the throat portion 30 of the electrode holder 21.

Figure 4:
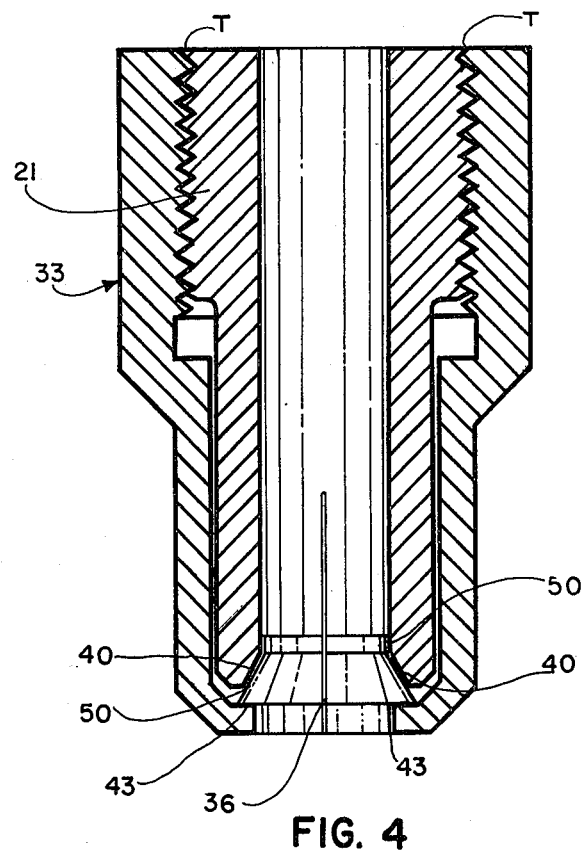
FIG. 4 is an enlarged vertical view partly in section of the collet-chuck assembly of this invention.
Figure 3:
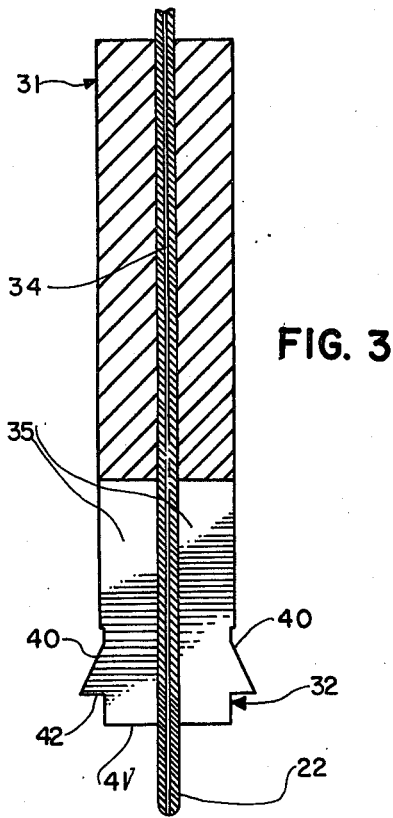
FIG. 3 is an enlarged vertical sectional view of the collet of FIG. 2 holding an electrode.

The collet 31 is best seen in FIGS. 3 and 4. It comprises an elongated tube of approximately 1.1 inch in length for electrodes between 0.012 and 0.125 in. diameter. The collet 31 has a precisely bored axial bore 34 extending at least 10 times the diameter of the bore 34. The collet 31 also includes two pair of diametrically crossed slots 35 and 36, one pair 35 of which appears in section in FIG. 3 and the opposite pair in FIG. 4. Preferably the electrodes and collets are available in stepped increments of 0.001 in. diameter with a different collet for each electrode. The slots in the collet have a preferred length in the order of 0.4 inch and a width of 0.004 to 0.006 for bore sizes up to 0.025 in. and 0.010 in. maximum for bore diameters above 0.025. Given these relationships, precise positioning with a fluid tight connection is possible. Employing this system, holes in the order of 0.031 have been drilled with a tolerance of 0.0005 inch.

These dimensions are all identified since the collet 31 constituting the heart of this invention cooperates with the electrode 22 through tolerance control and the application of holding pressure through a reverse taper 40 to provide concentric holding of the electrode 22 and effective fluid sealing as well.

The lower or outward end of collet 31 has a generally flat face 41 surrounded by an annular step 42 which is normal to the axis of the bore 34. This is designed to engage the inner face 43 of chuck 33 of FIGS. 2 and 4. The reverse tapered portion 40 is operative to apply the clamping pressure of the collet at a point inward from the end 32 of the collet and thereby achieve effective clamping. The elongated bore 34 having a diameter in the order of 0.0002 to 0.0001 in. greater than the electrode as measured on the fixed diameter of the collet, produces a slip fit relationship which is effective to prevent the leakage of dielectric fluid past the electrodes exterior. Thus the electrode 22 may be held accurately within the bore 34 with effective electrical contact between the inner wall of the bore 34 and the electrode 22. This contact also proves to be fluid tight as well.

In the normal use of the electrode assembly of this invention, in electric discharge machining, the electrode is consumed rapidly necessitating release and advance of the electrode 21. This is accomplished employing this invention simply by releasing the chuck 37 approximately one eighth turn, drawing the electrode 22 downward into contact with the work piece and retightening the chuck 33. No release or retightening of any seals is required.

The above described embodiments of this invention are merely descriptive of its principles and are not to be considered limiting. The scope of this invention instead shall be determined from the scope of the following claims, including their equivalents.

I claim:

1. An electrode holder for holding a rod like electrode having an axial passage throughout its length, said electrode being adapted to be used in an electron discharge machining comprising;

an axially extending tubular body including a conical outward flaring entrance opening at one end thereof, and a threaded portion on the outer periphery of said body;

a collet adapted to be received within said tubular body, said collet constituting a generally tubular electrically conductive body having an end portion and a conical flange portion adjacent to the outermost end thereof dimensioned to engage the conical entrance opening of said tubular body;

a ring shaped chuck means including internal threads for engaging the threaded portion of said tubular body and including an internal surface engaging said collet end portion for selectively applying or releasing clamping force between said collet and said body at said engaging conical portions;

said collet having an axial bore therethrough dimensioned to hold an electrode of circular cross section therein;

said collet including at least one longitudinal slot therethrough extending from the outermost end thereof along the axis of said axial bore for a portion of the length of said axial bore;

said bore having a length in the order of at least 10 times its diameter said diameter being sufficient to provide a slip fit with an electrode positioned therein with said chuck means in clamping force releasing condition;

the elongated contact between the inner wall of said collet defining said bore and the surface of electrode positioned therein, defining a fluid tight seal therebetween; and means for applying fluid to the bore of said tubular body.

2. The combination in accordance with claim 1 wherein the slot of said collet has a slot width in the order of 0.010 in or less and extending in the order of 40% of the length of said collet.

3. The combination in accordance with claim 2 wherein said collet includes a pair of diametrical slots.

4. The combination in accordance with claim 1 wherein said collet includes an annular surface adjacent to said conical portion and engaging the said internal surface of said chuck means.

* * * * *